Dec. 17, 1940.  A. R. THOMPSON  2,225,137
APPARATUS FOR CONVEYING CANNED GOODS
Filed Sept. 19, 1939  2 Sheets-Sheet 1
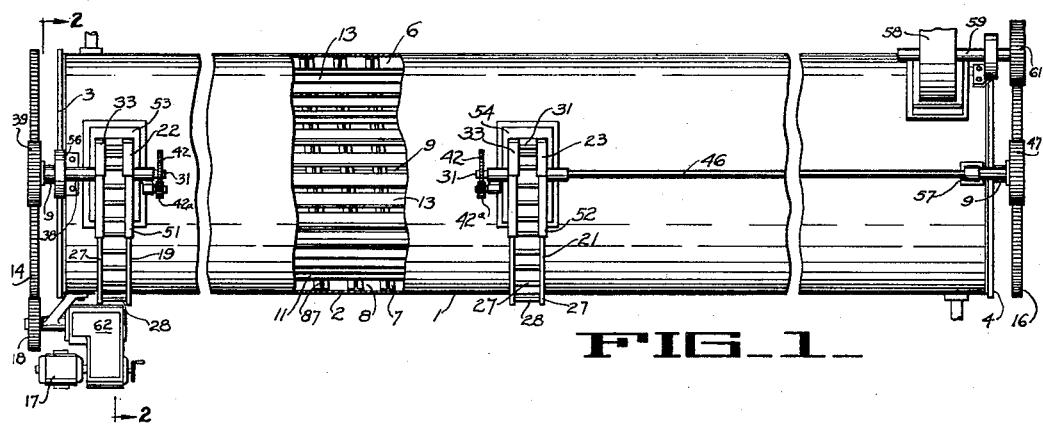
FIG_1_
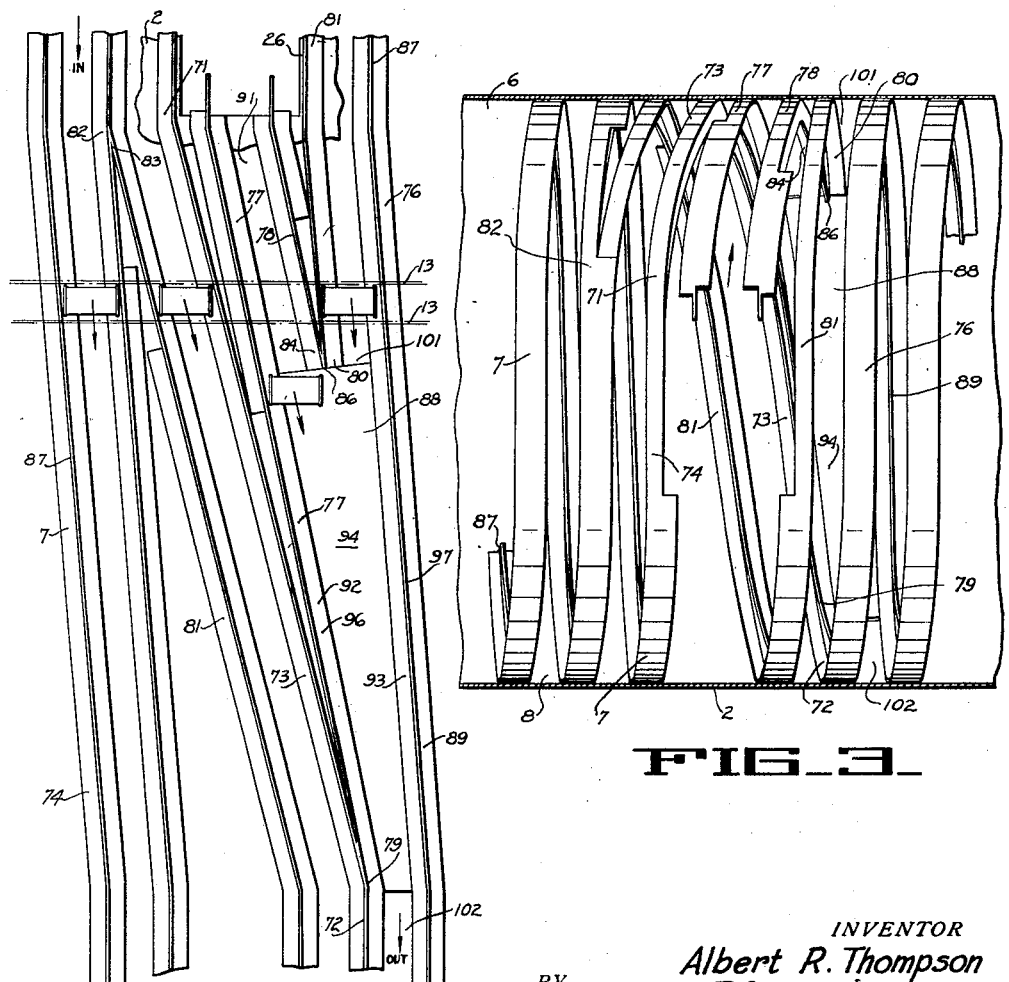
FIG_3_
FIG_5_
INVENTOR
Albert R. Thompson
BY Philip A. Minnis
ATTORNEY Dec. 17, 1940. A. R. THOMPSON 2,225,137
APPARATUS FOR CONVEYING CANNED GOODS
Filed Sept. 19, 1939 2 Sheets-Sheet 2
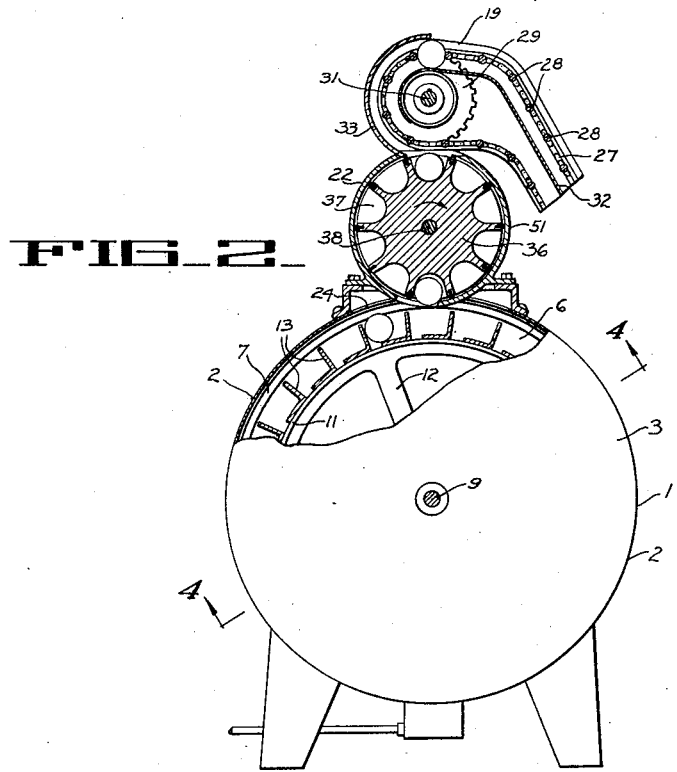
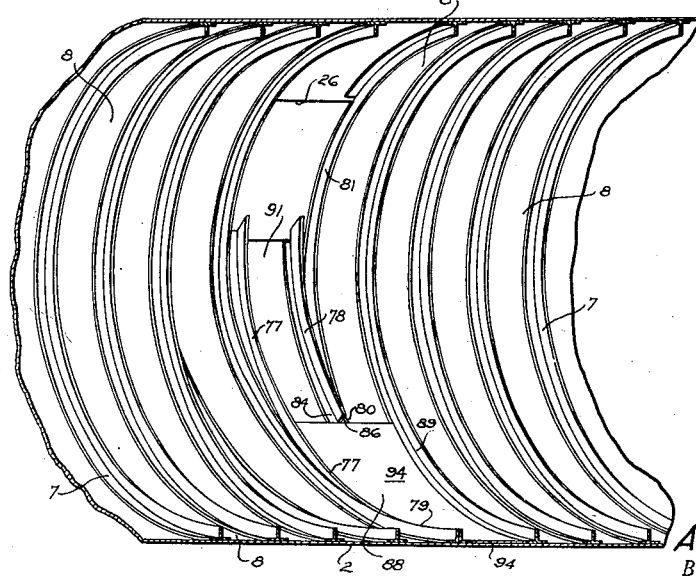
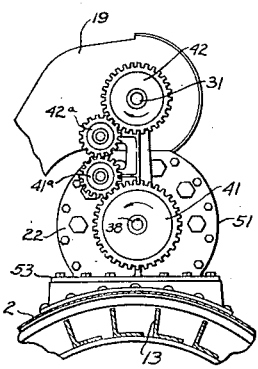
INVENTOR.
Albert R. Thompson
BY Philip A. Minnis
ATTORNEY Patented Dec. 17, 1940

2,225,137

UNITED STATES PATENT OFFICE 2,225,137

APPARATUS FOR CONVEYING CANNED GOODS

Albert R. Thompson, Los Gatos, Calif., assignor to Food Machinery Corporation, San Jose, Calif., a corporation of Delaware Application September 19, 1939, Serial No. 295,580

14 Claims. (Cl. 198—215)

The present invention appertains in general to a continuous canned goods cooker construction of the spiral canway and rotatable reel type and concerns more particularly a double feed mechanism for the same.

Cookers of the type referred to are well known in the art and comprise a cooking compartment into which the cans are introduced by means of a feed valve. Arranged within the cooking compartment is a spiral canway along which the cans are propelled by means of a rotatable reel, while a discharge valve is provided for discharging the cans from the cooking compartment upon completion of the treatment of the contents thereof. In these types of cookers, the length of the cooking compartment and the speed of travel of the cans therethrough determine the duration of the treating period of the canned goods.

The duration of the treatment period for different commodities varies considerably and a variation in the cooking time has heretofore been effected by increasing or decreasing the speed of operation of the feed valve, reel, and discharge valve of the cooker to thereby vary the speed of travel of the cans through the cooking compartment thereof.

However, due to the construction of the valves and their cooperation with the reel in timed relation to effect the feeding of the cans into the cooker and their discharge therefrom, the speed of operation of the valves is rather limited and the obtainable variations are therefore not sufficient for adapting the cooker for treatment of a great variety of products.

Furthermore, the increase in the speed of operation of the cooker increases the agitation of the canned goods, which is undesirable in the treatment of certain commodities such as peas, berries, or other fragile vegetables or fruits.

It is therefore the primary object of the present invention to provide an improved cooker construction for treating canned goods, which includes means for varying the duration of the treating period of canned goods within wide limits.

Another object of the present invention is to provide a cooker construction adaptable for treatment of canned goods which includes means for varying the duration of the treatment period thereof within wide limits and without advancement of the canned goods through the cooking compartment at an excessive speed.

A further object of the present invention is to provide a cooker for canned goods including means for varying the duration of the treatment period of the canned goods without increasing or decreasing the agitation of the commodities to be treated therein.

A further object is to provide a cooker of the spiral canway and rotatable reel type having a plurality of feeding devices for introducing canned goods at various points into the cooking compartment of the same for varying the duration of the treating period of canned goods to be treated therein without variation of the speed of operation of the cooker.

Other and further objects and advantages of the present invention will become apparent from the following description and drawings, in which:

Fig. 1 is a plan view of the cooker construction of the present invention, certain parts of the same being broken away while others are shown in section.

Fig. 2 is a view partially in section and partially in elevation of the cooker construction shown in Fig. 1, the view being taken along the lines 2—2 thereof.

Fig. 3 is a transverse section through a portion of the cooker construction, the reel being omitted and the spiral guide rails being shown in elevation.

Fig. 4 is a perspective view of a portion of the cylindrical shell of the central section of the cooker, the view being taken looking in the direction of the lines 4—4 in Fig. 2.

Fig. 5 is a schematic view of the spiral guides adjacent the feed valve in the central portion of the cooker. The spiral guides shown in this illustration are laid out in a plane to clearly illustrate the position and relation of the parts thereof.

Fig. 6 is a side elevation of one of the feed valves and conveyor mechanisms employed in the present invention, certain parts of the cooker being shown in section.

Referring now to the drawings, and especially to Figs. 1 and 2 thereof, 1 indicates a pressure cooker construction, which comprises a hollow cylindrical shell 2 provided with end walls 3 and 4 forming a cooking compartment 6 into which steam or any other heating medium may be admitted in a well-known manner. The interior wall of the shell 2 is provided with a continuous spirally arranged guide rail 7 of T-like configuration in cross section, forming a helical pathway 8 for guiding containers through the cooking compartment from the feed end toward the discharge end thereof.

A shaft 9 rotatably mounted within the end walls 3 and 4 of the cylindrical shell 2 and extending axially of the same carries a reel 11 fixed thereto, which comprises a plurality of spider wheels 12 provided with L-shaped rails 13 extending longitudinally of the cylindrical shell 2 and in proximity with the guide rail 7 thereof. The free ends of the shaft 9 extend through the end walls 3 and 4 and are provided with gears 14 and 16. A motor 17, operatively connected to gear 14 by means of a pinion 18, is adapted to drive the reel 11 to effect rotation of the same, so that the cans, positioned upon the L-shaped rails 13 of the reel structure 11 and projecting into the spiral canway 8, are advanced upon rotation of the reel 11 from the feed end toward the discharge end of the cooker along the canway in a well known manner.

The cans to be treated within the cooking compartment are supplied to the cooker by means of conveyors 19 and 21 and feed valves 22 and 23, mounted upon the cooker structure and extending through the outer shell 2 of the same through openings 24 and 26, respectively, (see Figs. 2 and 4). Each of the conveyors 19 and 21 consists of a pair of endless conveyor chains 27, which are provided with spaced rods 28 intermediate the same, and which are trained around sprockets 29 keyed to shafts 31 by which the conveyors are driven. Each of the conveyors 19 and 21 comprises further a can supporting table 32, (see Fig. 2) so that cans placed between the supporting rods 28 and upon the table 32 are elevated and discharged into a curved chute 33 associated with each conveyor and positioned adjacent the upper ends of the same.

The cylindrical shell is provided with the feed valves 22 and 23 previously referred to. These feed valves are of identical construction, and therefore only one of the same has been illustrated in detail in Fig. 2.

The feed valve 22 is positioned adjacent the side wall 3 of the cylindrical shell 2 and extends into the cooking compartment 6 through the opening 24 in the shell. The feed valve 23 is positioned upon the shell 2 intermediate the feed valve 22 and the end wall 4, preferably half-way between the end walls 3 and 4, as will be clearly seen from Fig. 1. The feed valve 23 extends into the cooking compartment 6 through the opening 26 previously referred to. Each of the feed valves 22 and 23 comprises a rotary turret valve 36 (see Fig. 2) provided with a plurality of can compartments or pockets 37. The turret valve 36 of the feed valve 22 is fixed upon a shaft 38 provided with a pinion 39 intermeshing with the gear 14 mounted upon the shaft 9 of the cooker structure. The shaft 38 is further provided with a gear 41, which drives a gear 42 mounted upon the shaft 31 of the conveyor mechanism 19 by means of pinions 41a and 42a. From the above it will therefore be seen that upon rotation of the gear 14 the feed valve 22 and conveyor mechanism 19 are operated in timed relation with respect to each other and also with respect to the rotatable reel 11. The turret valve 36 of the feed valve 23 is fixed upon a shaft 46, which extends longitudinally of the cylindrical shell 2 and carries at its free end a pinion 47 intermeshing with the gear 16, mounted upon the shaft 9 adjacent the discharge end of the cooker structure. The shaft 46 is operatively connected with the shaft 31 by means of gears 41, 41a, 42, and 42a in the same manner as hereinbefore described in respect to shafts 38 and 31 of the conveyor mechanism 19. It will therefore be noted that upon rotation of the gear 16 the feed valve 23 and conveyor mechanism 21 are operated in timed relation with respect to each other and the rotatable reel 11 mounted within the cylindrical shell 2. The shafts 38 and 46 are supported within the casings 51 and 52 within which the turret valves 36 are mounted. The casings 51 and 52 are secured by means of flanges 53 and 54, respectively, to the cylindrical shell 2, as will be clearly seen from Fig. 1. Additional bearings 56 and 57 mounted on the cylindrical shell 2 may be provided for supporting the shafts 38 and 46, respectively, in proper position, as shown in Fig. 1.

Mounted upon the discharge end of the cooker 1 adjacent the end wall 4 is a discharge valve for discharging the cans from the cooking compartment 6 after completion of the treatment thereof. The discharge valve 58 may be of any conventional construction, and is provided with a shaft 59 for operating the same, which comprises a pinion 61 cooperating with gear 16 previously referred to, so that the discharge valve 58 is operated in timed relation with respect to the reel 11 for discharging the cans from the cooker 1 in a very well known manner.

Interposed between the gear 18 and motor 17 is a variable gear reduction mechanism 62, as shown in Fig. 1, for varying the speed of rotation of the gear 14 to thereby effect a variation in the speed of operation of the reel 11, feed valves 22 and 23, conveyor mechanisms 19 and 21, and discharge valve 58, so as to control the speed of advancement of the cans travelling through the cooking compartment 6 within certain limits.

Referring now specifically to the construction of the spiral guide rail 7, it should be noted that the same extends from the feed valve 22 to the discharge valve 58 throughout the entire length of the cooking compartment 6, and cans delivered to the cooking compartment 6 by means of the feed valve 22 are placed upon the L-shaped rails 13 are positioned between adjacent convolutions of the spiral rail 7 and project into the canway 8 defined by the same. Upon rotation of the reel 11 the cans will be rotated therewith, and are thereby shifted in axial direction relative to the reel 11 along the canway 8 by means of the guide rails 7. In this manner the cans are advanced in a longitudinal direction through the cooking compartment 6 from the feed valve 22 to the discharge valve 58, which finally effects discharge of the cans from the cooking compartment, upon completion of the travel of the cans through the cooker structure 1. By means of the gear reduction box 62, the speed of advancement of the cans may be varied within certain limits, so that the cooking period of the contents of the cans may be varied to thereby lengthen or shorten the cooking period in conformity with the requirements of practice.

If the cooking period for a certain commodity is such that the speed variations in the operation of the wheel 11, feed valve 22, and discharge valve 58 are insufficient, the cans are supplied to the cooking compartment 6 over the feed valve 23 of the cooker structure. This feed valve, which is positioned halfway between the end walls 3 and 4 of the cylindrical shell 2, will cause the entrance of the cans into the cooking compartment 6 of the cooker at a point considerably closer to the discharge valve 58; and the cans will therefore travel only through a portion of the cooking compartmnt and the treating period thereof is thereby considerably shortened. When the cans are supplied to the feed valve 23 and treated within the cooking compartment portion intermediate the feed valve 23 and discharge valve 58, a variation of the speed of rotation of the reel, the feed valve 23, and the discharge valve 58 may be also obtained by means of the gear reduction mechanism 62. It will therefore be seen that the speed of travel of the cans between the feed valve 23 and discharge valve 58 may be further regulated to increase or reduce the treatment period of the canned goods within certain limits.

It is therefore apparent that by providing the cooker construction of the present invention with two feed valves it is possible to advance the cans through the entire length of the cooking compartment 6 or, if desired, only through a portion of the same, and to vary additionally the speed of advancement of the cans by varying the speed of rotation of the reel so that the cooker of the present invention will be universally adaptable for the treatment of any kind of commodity to be cooked and sterilized therein.

While the cans delivered to the cooking compartment 6 by means of the feed valve 22 are positioned upon the L-shaped rails 13 between adjacent convolutions of the spiral rail 7 and travel along the canway 8 formed by the same, special provisions have to be made for supplying the cans to the cooking compartment 6 by means of feed valve 23 and for directing the same into the canway 8, so that the cans will be advanced from the feed valve 23 to the discharge valve 58.

Referring now to Figs. 3, 4, and 5, it will be noted that the lead of the spiral rail 7 is uniform from the feed valve 22 to a point 71, and from point 72 to the discharge valve 58. Intermediate points 71 and 72, (see Fig. 3) the pitch of the spiral rail 7 is accelerated. In other words, the helix angle of the portion 73 of the spiral rail 7, which is located intermediate points 71 and 72, is larger than the helix angle of the portions 74 and 76 of the rail 7. The increased lead of the portion 73 is necessary to shunt the spiral rail 7 around the feed valve 23 and the opening 26 to by-pass the same.

Mounted within the space between rail portions 73 and 76 and welded to the inner surface of the cylindrical shell 2 are switch rails 77 and 78. The switch rail 77 extends from the valve opening 26 of the shell 2 in a spiral curve and terminates into a frog 79, welded to rail portion 73, as will be clearly seen from Figs. 3 and 5. The switch rail 78 extends from the valve opening 26 of the shell in a helical curve, and parallel to switch rail 77, and meets the end 80 of a helical switch rail 81, welded to the inner surface of the shell 2 and the rail portion 82 of the spiral rail 7, forming a frog 83 therewith. The ends 84 and 80 of the switch rails 78 and 81 are welded together and form a frog 86.

The canway 8 is formed by the stems 87 of adjacent convolutions of the rail 7, but due to the increased lead of the portion 73 of the rail 7 in the center section of the cooker in the vicinity of the feed valve 23, the employment of a helical switch rail 81, above referred to, which cooperates with the rail portions 73 and 76, is necessary to provide a continuation of the canway 8 through this section.

The proper width of the canway 8 is therefore maintained throughout the entire cooker structure with the exception of canway portion 88 between switch rail 77 and guide rail portions 89, adjacent the frog 86. This canway portion 88 is comparatively wide adjacent the frog 86 and forms a converging throat to permit the juncture of canway 91, formed by the switch rails 77 and 78, with canway 8 so that cans introduced into the cooker over canway 91 may enter the canway 8 and continue their travel within the same toward the discharge valve 58. To prevent a jamming of the cans within the section 88 of canway 8 between the flange portions 92 and 93 of switch rail 77 and rail portions 89 respectively, a filler plate 94 of wedge-shaped configuration is welded to the interior of the shell 2 between the flange sections 92 and 93, as clearly shown in Figs. 4 and 5.

It should further be noted that the canway section 88 converges in the direction of the travel of the cans to the normal width of canway 8, and the cans may therefore properly pass this section and will be advanced in axial direction by engagement with the switch rail 77 during the rotation of the reel.

Certain flange portions of the guide rail 7, helical switch rail 81 and switch rails 77 and 78 are cut away, as best seen from Figs. 3 and 5, to permit the assembly of the parts as described above, and to clear the opening 26 for connection of the feed valve 23.

Due to the width of the canway section 88, the cans passing therethrough may shift slightly in axial directions between the stem portions 96 and 97 of the helical switch rail 77 and portion 89 of the rail 7. However, this slight independent axial movement of the cans is inconsequential, as the same will nevertheless be properly guided by the stem portion 96 of the helical switch rail 77 and are always under control.

From the above it will therefore be seen that upon operation of the cooker structure disclosed herein, when the cans are supplied to the feed valve 22, the same will be advanced through the cooking compartment along the canway 8 to the discharge valve 58 which discharges the cans. During their travel, the cans will enter the canway section 88 at 101 and leave the same at 102.

When the cans are supplied to the cooking compartment over feed valve 23, the same enter the canway section 88 over canway 91 formed by the switch rails 77 and 78 and leave the same at 102 during their travel to the discharge valve 58.

When the cans are introduced into the cooker over feed valve 23, the treatment period of the contents of the cans is considerably shortened due to the fact that the cans travel only through a portion of the cooking compartment, and further variations in the duration of the treating period may be obtained by varying the speed of operation of the reel 11, conveyor 21, feed valve 23, and discharge valve 58, by means of the variable speed drive 62. In case a considerably longer treatment period of the canned goods is required, the cans are introduced over feed valve 22, so that the full length of the cooking compartment is utilized, and additional variations of the treating period may be obtained by varying the speed of operation of the conveyor 19, feed valve 22, discharge valve 58, and reel 11.

The range of variation of the treatment period obtainable with the cooker herein described renders the same adaptable for the cooking and sterilization of a great variety of commodities, and provides an apparatus universally adaptable in the canning field.

It should be noted that while the present invention has been illustrated in connection with pressure cooking apparatus it will be obvious that it is equally well adaptable for cooling apparatus or any other type of cooking apparatus of similar construction, and that instead of a single auxiliary feed valve and accelerated canway section a plurality of the same may be employed.

While I have described a particular embodiment of the present invention, it will be obvious that various changes and modifications may be made in the details of the apparatus shown herein, without departing from the spirit of the present invention and the scope of the appended claims.

Having now described my invention and in what manner the same may be used, what I claim as new and desire to protect by Letters Patent is:

1. In apparatus for treating canned goods, a shell forming a treating compartment, a spiral canway on the inner circumference of the shell, a rotatable reel cooperating with the spiral canway for advancing cans along said canway through said treating compartment, can inlet and outlet means on the shell for admitting cans into the canway and for discharging the same therefrom, and means intermediate said inlet and outlet means for admitting cans into said canway, said canway having a section with an accelerated pitch for shunting the cans around the intermediate means to by-pass the same.

2. In apparatus for treating canned goods, a cylindrical shell forming a treating compartment, a spiral canway on the inner circumference of the shell, a rotatable reel cooperating with the spiral canway for advancing cans along said canway through said treating compartment, can inlet and outlet means on the shell for admitting cans into the canway and for discharging the same therefrom, and means intermediate said inlet and outlet means for admitting cans into said canway, said canway having a section with an accelerated pitch for shunting the cans around the intermediate means to by-pass the same.

3. In apparatus for treating canned goods, a cylindrical shell defining a treating compartment provided with a spiral canway, a feed valve on one end of the shell for feeding cans into said canway, a discharge valve on the other end of the shell for discharging the cans from the canway, an intermediate valve between the feed valve and discharge valve, means for directing cans from the intermediate valve into the canway, and means for advancing the cans along said canway, the helix angle of the canway adjacent the intermediate valve being such that cans fed into the canway by the feed valve are shunted around the intermediate valve to by-pass the same.

4. In apparatus for treating canned goods, a cylindrical shell forming a treating compartment, can inlet and outlet means on said shell, means for advancing the goods continuously through said compartment from the inlet means to the outlet means thereof, comprising a fixed helically directed rail about the inner circumference of said shell defining a canway, and a rotatable reel having a peripheral series of rails parallel with its axis and lying within the helical rail, means intermediate the inlet and outlet means for admitting cans into said treating compartment, said rail having a section with an accelerated pitch, and a helical rail adjacent said accelerated rail section for continuing said canway through said accelerated canway section to by-pass the cans around said intermediate means.

5. In apparatus for treating canned goods, a cylindrical shell forming a treating compartment, means for advancing the goods continuously through said compartment, comprising a fixed helically-directed rail about the inner circumference of the shell defining a canway, and a rotatable reel cooperating with the same, an inlet valve on said shell for admitting cans into said canway, an outlet valve for discharging cans from said canway, means on said shell intermediate the inlet and outlet valves for admitting cans into the canway, said rail having a section with an accelerated pitch, and another helically-directed rail adjacent said accelerated rail section for continuing said canway through said accelerated section for shunting the cans past said intermediate means.

6. In apparatus for treating canned goods, a cylindrical shell forming a treating compartment, means for advancing the goods continuously through said compartment, comprising a fixed helically-directed rail about the inner circumference of the shell defining a canway, and a rotatable reel cooperating with the same, an inlet valve on said shell for admitting cans into said canway, an outlet valve for discharging cans from said canway, an auxiliary valve on the shell for admitting cans into said compartment, means intermediate said auxiliary valve and canway for directing cans from the auxiliary valve into the canway, said rail having a section with an accelerated pitch, and a helically-directed rail adjacent said accelerated rail section for continuing the canway along said accelerated rail section for shunting the cans past said intermediate means.

7. In apparatus for treating canned goods, a cylindrical shell forming a treating compartment, a spiral canway on the inner circumference of the shell, a rotatable reel adjacent the spiral canway for shifting cans along the same through said treating compartment, a feed valve projecting into the canway at one end of the shell for admitting cans into said canway, a discharge valve adjacent the other end of the shell for discharging the cans from the canway, an auxiliary feed valve intermediate the feed valve and said discharge valve and projecting into said treating compartment for admitting cans thereto, said canway having a section with an accelerated pitch for shunting the cans admitted by the feed valve past said auxiliary feed valve, and means intermediate said accelerated canway section and auxiliary feed valve for directing cans admitted into the treating compartment by the auxiliary feed valve into said canway.

8. An apparatus for treating canned goods comprising a shell forming a treating compartment, a helically convoluted guide rail defining a spiral canway within said shell, means for shifting cans along said canway, means for admitting cans into said canway at one end of the shell, means for discharging cans from said canway at the other end of the shell, said guide rail having a section intermediate its ends with an accelerated pitch, a helically convoluted switch rail adjacent the intermediate section of the guide rail and cooperating with the same for continuing the canway through said intermediate section, auxiliary means for feeding cans into the treating compartment adjacent said intermediate guide rail section, and means between said auxiliary means and said helically convoluted switch rail and guide rail for directing cans supplied to the treating compartment by the auxiliary means into said canway.

9. An apparatus for treating canned goods comprising a shell forming a treating compartment, a helically convoluted guide rail defining a spiral canway within said shell, means for shifting cans along said canway, means for admitting cans into said canway at one end of the shell, means for discharging cans from said canway at the other end of the shell, said guide rail having a section intermediate its ends with an accelerated pitch, a helically convoluted switch rail adjacent the intermediate section of the guide rail and cooperating with the same for continuing the canway through said intermediate section of the guide rail, auxiliary means for feeding cans into the treating compartment adjacent said intermediate guide rail section, and a plurality of helically curved switch rails between said auxiliary means and said helically convoluted switch rail and guide rail forming an auxiliary canway for directing cans supplied to the treating compartment by the auxiliary means into said canway.

10. An apparatus for treating canned goods comprising a cylindrical shell forming a treating compartment, a helically convoluted guide rail defining a spiral canway within said shell, means for shifting cans along said canway, means for admitting cans into said canway at one end of the shell, means for discharging cans from said canway at the other end of the shell, said guide rail having a section with an accelerated pitch intermediate its ends, a helically convoluted switch rail adjacent the accelerated section of the guide rail and cooperating with the same for continuing the canway through said accelerated section, auxiliary means for feeding cans into the treating compartment adjacent said accelerated guide rail section, a helically curved switch rail between said auxiliary means and said helically convoluted switch rail, and a helically curved switch rail between said auxiliary means and said accelerated guide rail section, said helically convoluted guide rails being positioned parallel to each other forming an auxiliary canway leading into said canway for directing cans fed into said treating compartment by the auxiliary means into said canway.

11. An apparatus for treating canned goods comprising a cylindrical treating compartment, helically convoluted guide means within said compartment forming a spiral canway, means for advancing cans along said canway and through said treating compartment from one end to the other thereof, means for admitting cans into said canway at one end of the treating compartment, means for discharging the cans from the other end of the treating compartment, said guide means having an intermediate section with an accelerated pitch, helically convoluted means extending parallel to the intermediate section of said helically convoluted guide means and cooperating with the same for continuing the spiral canway through said intermediate section, auxiliary means for feeding cans into the treating compartment adjacent the intermediate section of the guide means, and means between said intermediate section of the guide means and the auxiliary means for admitting cans supplied by said auxiliary means into said canway.

12. An apparatus for treating canned goods comprising a cylindrical treating compartment, helically convoluted guide means within said compartment forming a spiral canway, means for advancing cans along said canway and through said treating compartment from one end to the other end thereof, means for admitting cans into said canway at one end of the treating compartment, means for discharging the cans from the other end of the treating compartment, said guide means having an intermediate section with an accelerated pitch, helically convoluted means extending parallel to the intermediate section of said helically convoluted guide means and cooperating with the same for continuing the spiral canway through said intermediate section, auxiliary means for feeding cans into the treating compartment adjacent the intermediate section of the guide means, and helically curved switch means connected to said guide means and helically convoluted means forming a converging throat portion therewith for guiding cans admitted to the treating compartment by said auxiliary means into said canway.

13. An apparatus for treating canned goods comprising a cylindrical treating compartment, a helically convoluted guide rail within said compartment forming a spiral canway, means for advancing cans along said canway and through said treating compartment from one end to the other end thereof, means for admitting cans into said canway at one end of the treating compartment, means for discharging the cans from the other end of the treating compartment, said guide rail having an intermediate section with an accelerated pitch, a helically convoluted switch rail extending parallel to the intermediate section of said helically convoluted guide rail and cooperating with the same for continuing the spiral canway through said intermediate section of the guide rail, auxiliary means for feeding cans into the treating compartment adjacent the intermediate section of the guide rail, helically curved switch rails connected to said guide rail and helically convoluted switch rail forming a converging throat portion therewith for guiding cans admitted to the treating compartment by said auxiliary means into said canway, and a filler plate within said throat section intermediate the helically convoluted rail and said guide rail for preventing jamming of the cans advanced therebetween.

14. An apparatus for treating canned goods comprising a cylindrical housing defining a treating compartment, a spiral canway fixed to said housing interior of the same, a reel rotatably mounted within said housing and provided with longitudinally extending means for engaging cans within said canway and for advancing the cans along the same and through said treating compartment upon rotation of the reel, valve means supported by said housing and extending into said treating compartment and canway for admitting cans thereto, discharge means on said housing for discharging the cans therefrom, and means secured to said housing intermediate said valve means and discharge means and extending into said canway for admitting cans into the canway of said treating compartment including a rotatable valve and an auxiliary canway connected with said first-mentioned canway and lying in circumferential alignment therewith for directing cans from said rotatable valve into said first-mentioned canway.

ALBERT R. THOMPSON.